(12) United States Patent
Abrishami et al.

(10) Patent No.: US 8,869,152 B1
(45) Date of Patent: Oct. 21, 2014

(54) METHODS AND PROCEDURES TO DYNAMICALLY ADJUST PROCESSOR FREQUENCY

(75) Inventors: Mehrdad Abrishami, Gaithersburg, MD (US); Jianwei Bei, Rockville, MD (US); Benjamin Beasley, North Potomac, MD (US)

(73) Assignee: Marvell International Ltd., Hamilton (BM)

( * ) Notice: Subject to any disclaimer, the term of this patent is extended or adjusted under 35 U.S.C. 154(b) by 1354 days.

(21) Appl. No.: 11/967,768

(22) Filed: Dec. 31, 2007

Related U.S. Application Data

(60) Provisional application No. 60/884,538, filed on Jan. 11, 2007.

(51) Int. Cl.
G06F 9/46 (2006.01)
G06F 1/00 (2006.01)
G06F 1/32 (2006.01)

(52) U.S. Cl.
CPC .............. *G06F 1/324* (2013.01); *Y02B 60/1278* (2013.01)
USPC ............ 718/102; 718/100; 713/300; 713/501

(58) Field of Classification Search
CPC ..... G06F 1/324; G06F 1/3296; G06F 1/3215; Y02B 60/1217; Y02B 60/1278; Y02B 60/1285
See application file for complete search history.

(56) References Cited

U.S. PATENT DOCUMENTS

| | | | |
|---|---|---|---|
| 7,366,486 B2 * | 4/2008 | Vorenkamp et al. | 455/182.3 |
| 7,646,836 B1 * | 1/2010 | Mays | 375/354 |
| 2003/0115428 A1 * | 6/2003 | Zaccarin et al. | 711/156 |
| 2004/0139302 A1 * | 7/2004 | Flautner et al. | 712/220 |
| 2004/0205757 A1 * | 10/2004 | Pering | 718/102 |
| 2005/0050373 A1 * | 3/2005 | Orenstien et al. | 713/320 |
| 2005/0132238 A1 * | 6/2005 | Nanja | 713/300 |
| 2005/0188189 A1 * | 8/2005 | Yeung et al. | 713/1 |
| 2006/0047987 A1 * | 3/2006 | Prabhakaran et al. | 713/322 |
| 2007/0139014 A1 * | 6/2007 | Girson et al. | 320/132 |

* cited by examiner

*Primary Examiner* — Meng An
*Assistant Examiner* — Caroline H Arcos

(57) ABSTRACT

A method for altering an operating frequency of a processor. The method includes monitoring a real-time performance indicator of a system, and determining a desired frequency in response to the indicator. The indicator may be an amount of idle time of a processor of the system. The method also includes selectively altering an operating frequency of the processor in response to a comparison of the desired frequency and the operating frequency, including increasing the operating frequency in response to the desired frequency being greater than the operating frequency, and decreasing the operating frequency only in response to the desired frequency being less than the operating frequency by more than a predetermined value.

10 Claims, 2 Drawing Sheets

METHODS AND PROCEDURES TO DYNAMICALLY ADJUST PROCESSOR FREQUENCY

CROSS REFERENCE TO RELATED APPLICATION

The present application claims the benefit of U.S. provisional application Ser. No. 60/884,538 filed on Jan. 11, 2007. The disclosure of the provisional application is incorporated herein by reference in its entirety.

FIELD OF THE DISCLOSURE

The present disclosure relates generally to the field of microprocessors, and more particularly to more efficiently adjusting the operating frequency of microprocessors to reduce power consumption.

BACKGROUND

Designers of smartphones, portable audio players, digital cameras, wireless headsets, and other such portable devices (sometimes referred to as power limited devices or PLDs) frequently need to balance a desire to add power consuming features with a desire to have a long battery life. Device designers can improve battery life by using a larger battery, but this is often undesirable because it increases the overall size of the device. For example, a designer of a smartphone might want the device to process high volumes of data at a high frequency and have a bright display, and at the same time be small enough to fit in a pants pocket. Adding features, such as a fast processor or a bright display, therefore typically either lessen a device's battery life or require a larger, higher capacity battery.

In order to achieve appropriate balance between including high power consuming features and keeping a device small, designers implement various power saving techniques. One such technique, sometimes referred to as "frequency scaling," involves adjusting the frequency of a processor depending on the processes being executed at any given time. Controlling logic within a PLD can increase the processor frequency based on a system specific event, such as a request to process data. Once the device completes the data processing, the controlling logic can lower the processor frequency. For example, the controlling logic within a PLD might raise the operating frequency of the device to its maximum in order to decode compressed audio or video and then lower the frequency upon completion of the processing.

As new events or applications that require higher processing power are initiated and terminated, the control logic constantly adjusts the device's operating frequency accordingly. If these events start and stop at a high rate, then the operating frequency of the PLD needs to be adjusted frequently. This constant adjustment of the operating frequency can be inefficient because there is a power loss associated with changing frequencies. Additionally, in response to an event, a system typically raises the operating frequency to its maximum even if the amount of data to be processed does not require such a high processing speed. A superior approach to adjusting the operating frequency of a PLD in response to specific events is to monitor system performance and determine an optimum or desired operating frequency based on the monitoring. Therefore, there exists in the art a need for an improved system and method for determining a power efficient operating frequency of a system.

SUMMARY

A system embodying aspects of the present invention can include means for reducing the power consumption of a PLD by dynamically adjusting the operating frequency of the system. The system can include means for monitoring different aspects of system performance, and based on the monitoring, can determine if a higher or lower operating frequency is desired. The system can further include means for altering its present operating frequency based on the determined desired frequency. By determining a desired frequency based on monitoring system performance rather than increasing and decreasing the processor speed based on external events, the dynamic adjustment mechanism can reduce how often the processor frequency is adjusted and the inefficiencies associated therewith. The system can also be configured to dynamically and gradually adjust the processor speed to handle additional load as additional applications are added to the system.

DETAILED DESCRIPTION

Figure 1:
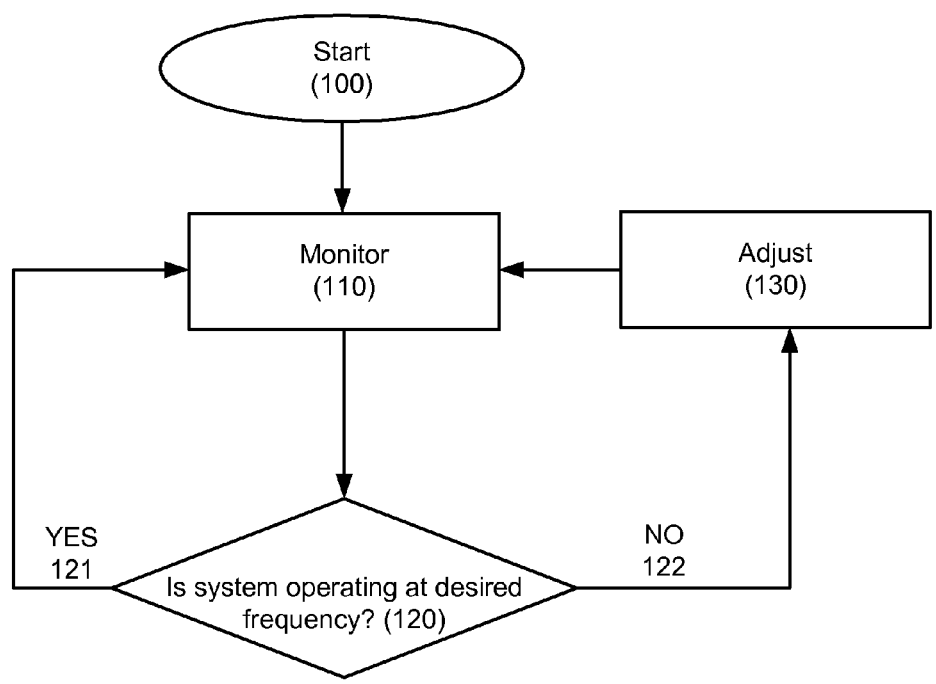
FIG. 1 shows a flow chart illustrating a method embodying aspects of the present invention.

FIG. 1 shows a flow chart illustrating a method embodying aspects of the present invention. The method can be implemented in a wide array of devices, including but not limited to smartphones, portable audio players, digital cameras, and wireless headsets. The method can begin when a device powers on or an application starts (block 100). While the device is operating, a performance parameter of the system can be monitored (block 110). Based on the monitored performance parameter, it can be determined if the device is operating at an optimum or desired frequency (block 120). If the device is operating at a desired frequency, then the operating frequency of the device might not be altered (path 121). If, however, the device is not operating at a desired frequency (path 122), then the operating frequency of the device can be adjusted to a desired frequency (block 130).

The desired frequency of the device (block 130) can be determined in a number of ways based on a user's or system designer's preferences. The desired frequency can be the minimum frequency needed to create a desirable user experience. The desired user experience may include giving certain processes a higher priority than other processes. For example, a user of a smartphone may desire that audio data be processed in real-time, but may not mind if the device temporarily delays the synchronization of addresses and the downloading of emails. Therefore, if a user of the smartphone receives a phone call, the desired frequency may be raised only high enough to handle the real time data processing needed for the phone call. A different user or system designer, however, may configure the system to raise the operating frequency to a speed fast enough to handle synchronization and downloading while also speaking on the phone.

With the foregoing considerations in mind, then, looking at the just-mentioned user preferences as an example, the monitoring may include monitoring to see whether a call is being made on the smartphone. When there is a call, the frequency may be raised high enough to handle the processing of the call, even if another activity might be ongoing, such as address book synchronization or e-mail downloading.

A system might be configured to differentiate between real-time tasks and non-real time tasks. For example, it might be desirable for a telephone to process audio in real time in order to function correctly, while tasks such as sending a text message and querying voice mail might not need to be done in real time. The system can determine a processor speed appropriate for handling real-time tasks in real time and non-real time tasks in a reasonable time that might not be real time.

The system can also be configured to prioritize among different real-time tasks. For example, processing audio signals and updating a display are both tasks that a user might want a phone to perform in real time, but if the system is operating at a frequency not high enough to handle both these functions in real time, then the system might give higher priority to the audio processing until the operating frequency has been raised to a desired frequency. Then, the refreshing of the display and the processing of the audio signal can both be done simultaneously in real time. The ultimate decisions of which tasks need to be processed in real-time and which tasks can be delayed and by how much they can be delayed can be left up to the discretion of the device designer, depending for example on either user preferences or designer preferences. As will be discussed below, the user also might be given discretion to alter certain settings to adjust the operating frequency.

Figure 2:
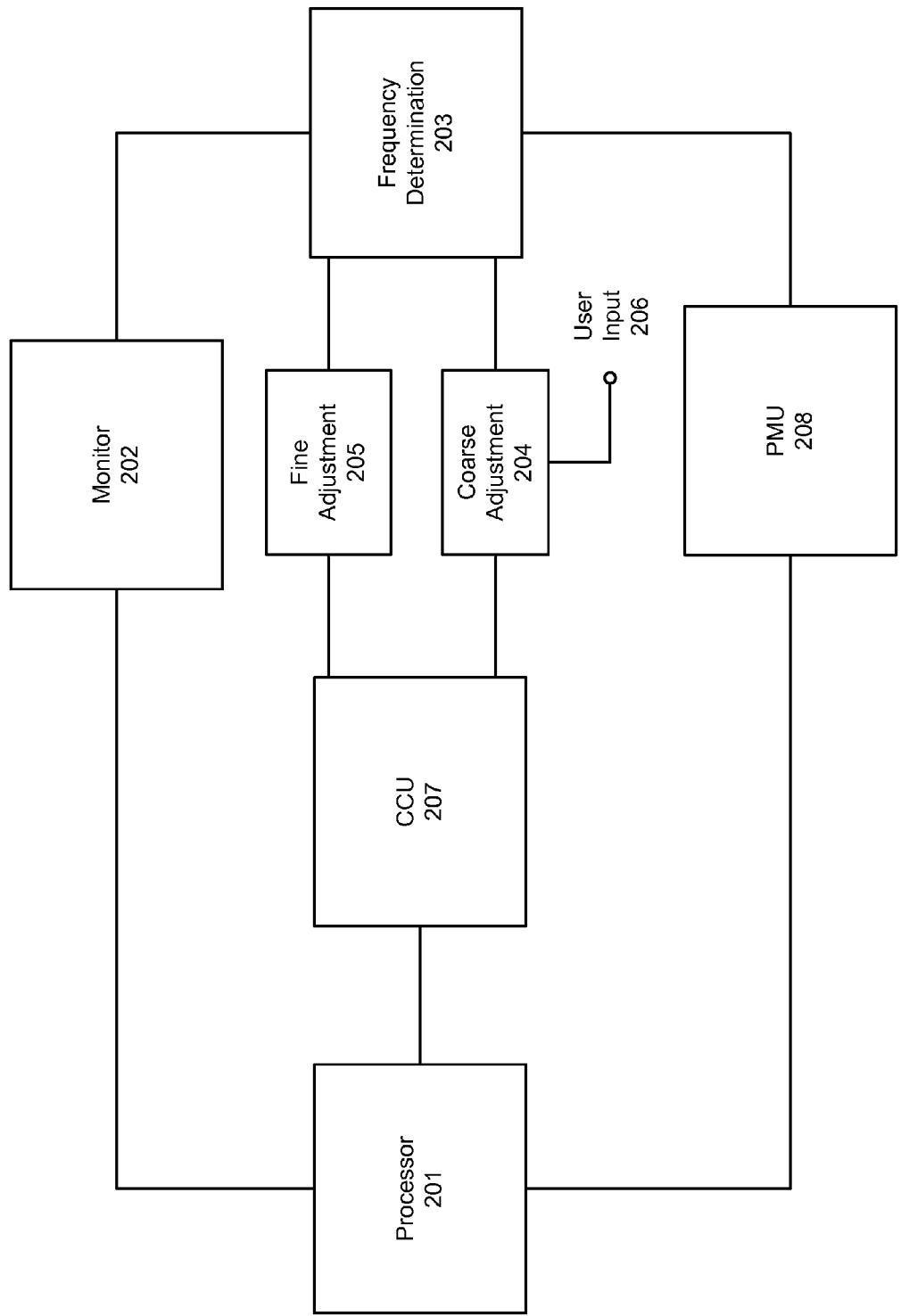
FIG. 2 shows a system embodying aspects of the present invention.

FIG. 2 shows a system embodying aspects of the present invention. The system can include a processor 201 and a monitoring unit 202 that monitors an indicator of the performance of the processor 201. The system can also have a clock control unit (CCU) 207 that alters the operating frequency of the system, and a power management unit (PMU) 208 that determines the amount of power being supplied to the system. Based on data obtained from the monitoring unit 202, a frequency determination unit (FDU) 203 can determine the desired frequency at which the system can operate and still perform all the desired real-time processing. If the FDU 203 determines that the system is already operating at the desired frequency, then it might not alter the operating frequency of the system. If, however, the FDU 203 determines that the system is running at a frequency that is either insufficiently low or insufficiently high to run certain real time applications, then it can adjust the operating frequency of the system either up or down accordingly. When adjusting the operating frequency of the system, the FDU 203 can concurrently instruct the PMU 208 to adjust the power being supplied to the system.

In the case of a smartphone, for example, the system developer might identify the transmission and reception of audio data when operating in a telephone mode as functions that need to be performed in real time. The system developer might also identify rudimentary screen updating, such as incrementing the timer when in a phone mode, as a process that needs to be performed in real time. Synchronizing with an email server, however, might be a process that does not need to be performed in real time. Therefore, if the monitoring unit 202 detects that the current operating frequency of the system is not sufficiently high to perform the audio and display processing in real time, then the FDU 203 can raise the operating frequency. If, however, the monitoring unit detects that the current operating frequency is high enough to perform the audio and display processing in real-time but not the synchronization, then the FDU 203 might not raise the operating frequency of the system, as email synchronization is not a process that needs to be or is desired to be performed in real time. The foregoing examples are intended to be illustrative; other relevant examples will be apparent to ordinarily skilled artisans.

In one embodiment, the FDU 203 can adjust the operating frequency of the system with either a coarse adjustment mechanism 204 or a fine adjustment mechanism 205. If the operating frequency needs to be adjusted by a large amount, then the coarse adjustment mechanism 204 might be used. If the operating frequency needs to be adjusted by only a small amount, then the fine adjustment mechanism 205 might be used. The process of adjusting the frequency might be an iterative process that involves a coarse adjustment followed by one or more fine adjustments. The system may also be configured so that the coarse adjustment mechanism 204 initially raises the operating frequency to a frequency higher than the desired frequency rather than to a frequency lower than the desired frequency in order to improve performance of the device during the frequency adjustment process. Also, the system may allow users to alter the operating frequency manually (see e.g. user input 206), for example, if a user desires to have non-essential tasks performed in real time.

The FDU 203 may be configured to alter the operating frequency only if it is a certain value away from the desired frequency. Alternatively, the FDU can be configured to increase the operating frequency whenever it is below the desired frequency, but to lower it only under specific circumstances, such as being more than a certain value away from the desired frequency.

The monitoring unit 202 can be configured to monitor the performance of the processor 201 in a variety of different manners. For example, the monitoring unit 202 of a system embodying aspects of the present invention might measure the time it takes to complete a series of desired real-time tasks, for example audio transmission and reception, at a given processor speed. The FDU 203 can compare the time measured by the monitoring unit 202 to an allotted amount of time needed or desired for satisfactory real-time operation. If the tasks are completed in less than a first allotted time, then the FDU 203 might reduce the operating frequency of the system. If it takes more than a second allotted time (which may or may not be the same as the first allotted time) to complete the real-time tasks, then the FDU 203 might increase the operating frequency of the system. The allotted time to complete the tasks can be changed depending on which tasks a user or system designer wants performed in real-time and which tasks can be delayed.

A second manner in which the monitoring unit 202 can operate is to monitor the amount of data being processed. For example, this monitoring can be achieved by monitoring real-time received or transmitted digital data stored in a buffer, such as a received-in or played-out buffer in the case of audio data. In audio transmission, for example, the rate at which the data is transmitted out of the buffer should be roughly the rate at which the processor 201 sends data to the buffer. If it is not, then the processor 201 will have to wait for data to be read out of the buffer before new data can be written to it. The monitoring unit 202 can monitor the amount of data being stored in the buffer. If the number of bits of data in the buffer is below a first threshold, then the system is capable of transmitting data at a faster rate, and the operating frequency of the system can be increased. Alternatively, when the number of bits of data in the buffer is above a second threshold (which may or might not be the same as the first threshold), then the processor is sending data to the buffer faster than data is being read from the buffer and the processor speed can be reduced. An artisan of ordinary skill will recognize that the monitoring unit 202 could also be configured to monitor an incoming buffer as well, in which case the operating frequency might be raised if the number of bits is above a certain threshold and lowered if the number of bits is below a certain threshold.

A third manner in which the monitoring unit 202 of a system embodying aspects of the present invention can operate is by monitoring the idle period of the processor 201. For example, if the monitoring unit 202 detects that the processor 201 is running in an idle state 80% of the time, then the FDU 203 can lower the operating frequency of the system. At a lower frequency, the processor 201 still may be able to process data fast enough to support any real-time applications the system might be running, but will do so with less idle time. The lower operating frequency can reduce power consumption in the system. Alternatively, as another example, if the processor 201 is running in an idle state 20% of the time, then the FDU 203 can raise the operating frequency of the system. Other thresholds will be apparent to ordinarily skilled artisans. The threshold for raising or lowering the operating frequency may be the same.

It will be readily apparent to one of ordinary skill in the art that the various manners of monitoring described above are merely exemplary and not exhaustive. It will also be readily apparent to one of ordinary skill in the art that various manners described can be used either individually or in combination with one another.

The previous description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment. Therefore, the present invention is not intended to be limited to the embodiments described herein but is to be accorded the widest scope defined only by the claims below and equivalents thereof

What is claimed is:

1. A method comprising:
    monitoring a real-time performance indicator of a system, wherein the real-time performance indicator is an amount of idle time of a processor of the system;
    determining a desired frequency in response to the real-time performance indicator; and
    selectively altering, by increasing or decreasing, an operating frequency of the processor in response to a comparison of i) the desired frequency and ii) the operating frequency of the processor,
    wherein the selectively altering the operating frequency of the processor includes,
        in response to the desired frequency being greater than the operating frequency of the processor, increasing the operating frequency of the processor to the desired frequency, and
        only in response to the desired frequency being less than the operating frequency of the processor by more than a predetermined value, decreasing the operating frequency of the processor to the desired frequency, wherein the predetermined value is non-zero, and
    wherein increasing the operating frequency of the processor to the desired frequency includes:
        initially using a coarse adjustment to adjust the operating frequency of the processor to a first frequency that is not less than the desired frequency, and
        subsequent to using the coarse adjustment, using a fine adjustment to adjust the operating frequency of the processor from the initial frequency to the desired frequency.

2. The method of claim 1, further comprising:
    increasing the desired frequency in response to an amount of time needed to complete a task being greater than a predetermined amount of time.

3. The method of claim 1, further comprising:
    decreasing the desired frequency in response to an amount of time needed to complete a task being less than a predetermined amount of time.

4. The method of claim 1, further comprising:
    decreasing the desired frequency in response to the amount of idle time being greater than a threshold value.

5. The method of claim 1, further comprising:
    increasing the desired frequency in response to the amount of idle time being less than a threshold value.

6. The method of claim 1, further comprising:
    increasing the desired frequency in response to an amount of data in a buffer being above a threshold level.

7. The method of claim 1, further comprising:
    decreasing the desired frequency in response to an amount of data in a buffer being below a threshold level.

8. The method of claim 1, wherein altering the operating frequency of the processor further includes altering the operating frequency of the processor in response to receiving a user input.

9. The method of claim 1, wherein decreasing the operating frequency of the processor includes:
    initially using the coarse adjustment to adjust the operating frequency of the processor to a second frequency that is not less than the desired frequency; and
    subsequent to using the coarse adjustment, using the fine adjustment to adjust the operating frequency of the processor from the second frequency to the desired frequency.

10. A method of operating a system including a processor, the method comprising:
    monitoring real-time performance indicators of the system, wherein the real-time performance indicators include an amount of idle time of the processor, an amount of time elapsed in completing a predetermined task, and an amount of data in a buffer;
    determining a desired frequency in response to the real-time performance indicators, including
        increasing the desired frequency in response to the amount of idle time of the processor being less than a first threshold value,
        decreasing the desired frequency in response to the amount of idle time of the processor being greater than a second threshold value,
        increasing the desired frequency in response to the amount of time elapsed in completing the predetermined task being greater than a first predetermined amount of time,
        decreasing the desired frequency in response to the amount of time elapsed in completing a task being less than a second predetermined amount of time,
        increasing the desired frequency in response to the amount of data in the buffer being above a first threshold level, and
        decreasing the desired frequency in response to the amount of data in the buffer being below a second threshold level; and
    selectively altering an operating frequency of the processor in response to a comparison of i) the desired frequency and ii) the operating frequency of the processor,
    wherein the selectively altering the operating frequency of the processor includes in response to the desired frequency being greater than the operating frequency of the processor, increasing the operating frequency of the processor to the desired frequency, and only in response to the desired frequency being less than the operating frequency of the processor by more than a predetermined value, decreasing the operating frequency of the processor to the desired frequency, wherein the predetermined value is non-zero, wherein increasing the operating frequency of the processor to the desired frequency includes initially using a coarse adjustment to adjust the operating frequency of the processor to a first frequency that is greater than the desired frequency, and subsequent to using the coarse adjustment, using a fine adjustment to adjust the operating frequency of the processor from the first frequency to the desired frequency, and wherein decreasing the operating frequency of the processor to the desired frequency includes initially using the coarse adjustment to adjust the operating frequency of the processor to a second frequency that is greater than the desired frequency, and subsequent to using the coarse adjustment, using the fine adjustment to adjust the operating frequency of the processor from the second frequency to the desired frequency.

\* \* \* \* \*